(12) United States Patent
Malladi et al.

(10) Patent No.: US 8,549,462 B2
(45) Date of Patent: Oct. 1, 2013

(54) THERMAL COUPLING DETERMINATION AND REPRESENTATION

(75) Inventors: Ramana M. Malladi, Williston, VT (US); Sharon L. Von Bruns, Westford, VT (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 13/215,868

(22) Filed: Aug. 23, 2011

(65) Prior Publication Data

US 2013/0055178 A1    Feb. 28, 2013

(51) Int. Cl.
*G06F 17/50*    (2006.01)

(52) U.S. Cl.
USPC .......................................... 716/136

(58) Field of Classification Search
USPC ................. 716/132–133, 135, 138, 156–136; 324/750.07, 750.03–750.06
See application file for complete search history.

(56) References Cited

U.S. PATENT DOCUMENTS

| | | | |
|---|---|---|---|
| 4,604,572 A * | 8/1986 | Horiuchi et al. ......... | 324/750.03 |
| 6,149,299 A | 11/2000 | Aslan et al. | |
| 6,914,424 B2 * | 7/2005 | Chi et al. ................. | 324/750.03 |
| 6,914,764 B2 | 7/2005 | Clabes et al. | |
| 6,956,390 B1 * | 10/2005 | Feltner et al. ............ | 324/750.03 |
| 6,985,000 B2 * | 1/2006 | Feder et al. .............. | 324/750.05 |
| 7,039,888 B2 | 5/2006 | Steinmann et al. | |
| 7,176,508 B2 | 2/2007 | Joshi et al. | |
| 7,347,621 B2 * | 3/2008 | Sri-Jayantha et al. ........ | 374/166 |
| 7,356,441 B2 | 4/2008 | Kerkman et al. | |
| 7,408,369 B2 * | 8/2008 | MacLean et al. ........ | 324/750.03 |
| 7,574,321 B2 | 8/2009 | Kernahan et al. | |
| 7,862,233 B2 | 1/2011 | Hyde et al. | |
| 7,888,951 B2 * | 2/2011 | Lupashku et al. ....... | 324/750.03 |
| 2005/0127932 A1 * | 6/2005 | Maggi et al. .................. | 324/760 |
| 2005/0166166 A1 * | 7/2005 | Chandra et al. ................... | 716/4 |
| 2006/0238212 A1 * | 10/2006 | Lopez .......................... | 324/760 |
| 2008/0129322 A1 * | 6/2008 | Taylor et al. .................. | 324/760 |
| 2008/0163135 A1 * | 7/2008 | Chandra .......................... | 716/2 |
| 2009/0160472 A1 * | 6/2009 | Segawa et al. ................ | 324/760 |
| 2010/0013509 A1 * | 1/2010 | Setoguchi et al. ............ | 324/760 |
| 2011/0267082 A1 * | 11/2011 | Fregeau et al. ........... | 324/750.03 |
| 2012/0019274 A1 * | 1/2012 | Kinsley .................... | 324/750.03 |
| 2012/0119767 A1 * | 5/2012 | Su ............................ | 324/750.03 |

OTHER PUBLICATIONS

Andrews, Joel, Design of SiGe HBT Power Amplifiers for Microwave Radar Applications, Georgia Institute of Technology, May 2009.
Beckrich-Ros et al., "A Nodal Model Dedicated to Self-Heating and Thermal Coupling Simulations", IEEE Transactions on Semiconductor Manufacturing, vol. 21, No. 2, May 2008.

(Continued)

*Primary Examiner* — Stacy Whitmore
(74) *Attorney, Agent, or Firm* — David A. Cain; Hoffman Warnick LLC (57) ABSTRACT

Thermal coupling effects are represented as current into a thermal node of an initial design structure. The current is determined using a thermal coupling coefficient, and thermal resistance and thermal capacitance of a self-heating network of the initial design structure. By using another design structure with devices substantially identical to those of the initial design structure at known locations, operating a device as a heater while operating another device as a heat sensor, and measuring thermal response of the heater and the heat sensor, a thermal coupling coefficient may be determined.

3 Claims, 12 Drawing Sheets

(56) References Cited

OTHER PUBLICATIONS

Kojima, et al., "Novel Electro-Thermal Coupling Simulation Technique for Dynamic Analysis of HV (Hybrid Vehicle) Inverter", 37th IEEE Power Electronics Specialists Conference, Jun. 18-22, 2006, Jeju Korea.

Nenadovic, et al., "Extraction and Modeling of Self-Heating and Mututal Thermal Coupling Impedance of Bipolar Transistors", IEEE Journal of Solid-State Circuits, vol. 39, No. 10, Oct. 2004.

Sofia, John W., "Electrical Thermal Resistance Measurements for Hybrids and Multi-Chip Packages", Analysis Tech.

\* cited by examiner

THERMAL COUPLING DETERMINATION AND REPRESENTATION

BACKGROUND

The present invention relates to semiconductor devices and, more specifically, to improved representation of thermal coupling in semiconductor circuit design.

During operation, semiconductor devices may experience self-heating since a given device will produce heat as it dissipates power. Self-heating may result in thermal coupling when sufficient heat is produced to affect the operation of surrounding devices. For example, the gain of a device in a design structure or circuit may be decreased as a result of heating caused by the operation of other devices of the design structure or circuit. Unmodeled thermal interaction effects may result in unpredicted behavior of semiconductor devices and circuits, as well as shorter-than-expected component life and/or other undesirable effects.

To reduce or avoid negative effects of thermal coupling, such effects may be taken into account during the design process, particularly for high performance and high power applications. As the current density capability of components or devices of a semiconductor device or design structure increases, thermal coupling may become more pronounced, and predicting thermal coupling effects may figure more prominently in efficient and cost-effective placement of the components or devices in a design structure or circuit. To incorporate the representation of thermal coupling into the design process, however, a separate step is typically performed that may include adding discrete thermal coupling networks to design structure schematics, often manually.

SUMMARY

According to one embodiment of the present invention, a thermal coupling determination design structure may include at least a first device configured to be operable as a heater and at least a second device at a first location spaced apart from the first device and configured to be operable as a heat sensor. A data acquisition device may be configured to use the second device to measure heat responsive to the first device being operated as a heater. At least one thermal coupling coefficient may be determined by the data acquisition device based on the measured heat, and the at least one thermal coupling coefficient may be stored on a computer readable storage device.

In another embodiment, a thermal coupling modified design structure may be embodied in a machine readable storage device used in a design process. The design structure may include an initial design structure with at least a first self-heating network, the initial design structure being configured to produce at least a first electrical equivalent to the first self-heating network and a second electrical equivalent to the first self-heating network. In addition, at least a first heater design structure may have at least a first thermal output, and at least a first thermal coupling design structure.

A further embodiment may be implemented as a thermal coupling modified design structure embodied in a machine readable storage device used in a design process. The design structure may include an initial design structure with at least a first self-heating network. At least a first thermal coupling coefficient may be included for the initial design structure and used, along with a thermal resistance and a thermal capacitance of the first self-heating network, to determine an effective thermal resistance and an effective thermal capacitance for the initial design structure.

Another embodiment of the invention includes a method of representing thermal coupling effects in a semiconductor structure including at least a first device selectively operable as a heat source and at least a second device selectively operable as a heat sensor. The method may include operating the first device as a heater and operating the second device as a heat sensor. A first thermal response of the first device to operating as a heater may be measured, as may a first thermal response of the second device to operating the first device as a heater. At least one thermal coupling coefficient may be determined using the measured first thermal response of the first device and the measured first thermal response of the second device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

According to embodiments, a design structure may be analyzed to determine thermal coupling coefficients of each device of the design structure. Once the thermal coupling coefficients are determined, the thermal interaction of substantially identical devices in other circuit or design structures may be represented, allowing more effective prediction of the overall performance of the circuit or design structure.

Figure 1:
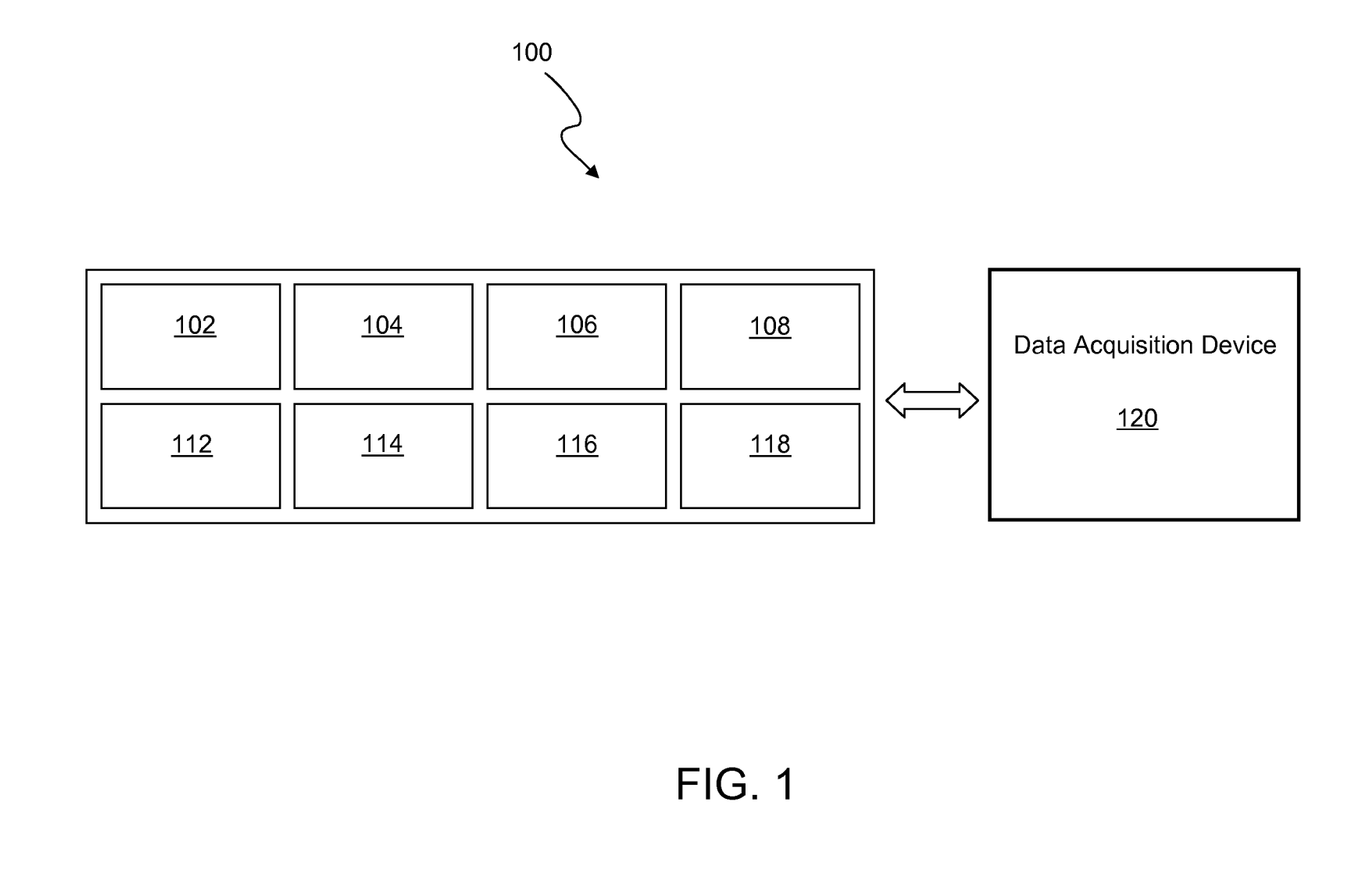
FIG. 1 is a schematic diagram of a thermal coupling determination design structure according to an embodiment of the invention disclosed herein.
Figure 2:
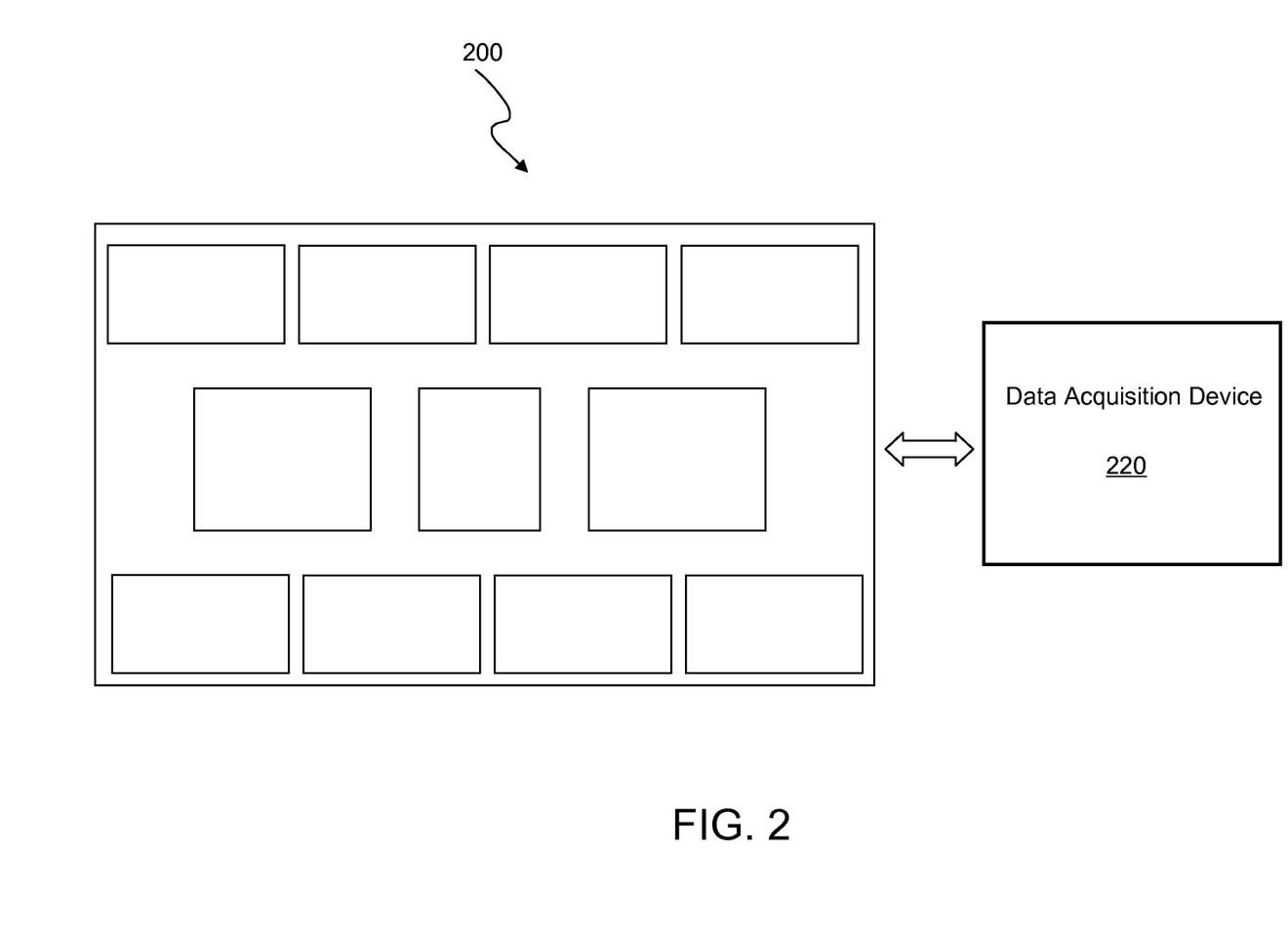
FIG. 2 is a schematic diagram of a thermal coupling determination design structure according to an embodiment of the invention disclosed herein.

To facilitate a description of a determination of thermal coupling coefficients of a circuit or design structure according to embodiments, reference is made to FIG. 1, which shows an example of a circuit or design structure 100. Circuit or design structure 100 may include a plurality of devices 102-118, eight in the example shown, that may each be independently operated and/or measured. To simplify analysis, each device 102-118 may be a bipolar transistor including an emitter, a collector, and a base. In embodiments of the invention, devices 102-118 may also and/or instead be capacitors, resistors, and/or other devices as may be desired and/or appropriate. Spacing between devices 102-118 is known, and a position on the circuit or design structure 100 may be expressed using, for example, Cartesian coordinates, such as x and y. As seen in FIG. 1, devices 102-118 may be evenly spaced. Data may be collected from circuit or design structure 100 and analyzed using a data acquisition device 120. It should be noted that embodiments of the invention need not have devices of identical size and/or type and need not have uniform spacing. For example, as seen in FIG. 2, a circuit or design structure 200 according to embodiments may include devices of different sizes and/or types that may be placed at various known positions, and in which data may be collected and analyzed using a data acquisition device 220.

Referring again to FIG. 1, when one device is powered on, it may generate heat due to self-heating, which may result in thermal coupling and may affect other devices on circuit or design structure 100. Each of the remaining devices of circuit or design structure 100 may have a thermal response to heat generated by such a powered device. To assess the impact of thermal coupling on each of the remaining devices of circuit or design structure 100, a respective thermal response of each device may be measured using any suitable technique for measuring a device response to steady-state and/or time-varying heat. For example, Gummel curves of a device may be employed to determine a device's response to a steady-state heat source, while a device's response to a time-varying heat source may be assessed using, for example, pulsed current-voltage (IV) measurement, and various AC measurement techniques may be employed to determine a device's small-signal thermal response. Gummel curves may be obtained by measuring a device's collector current $I_c$ and base current $I_b$ as the device's base-emitter voltage $V_{be}$ is stepped. In particular, since base-emitter voltage $V_{be}$ is temperature-dependent and inversely proportional to temperature, this kind of measurement may be used to quantify the internal temperature of a device.

Figure 3:
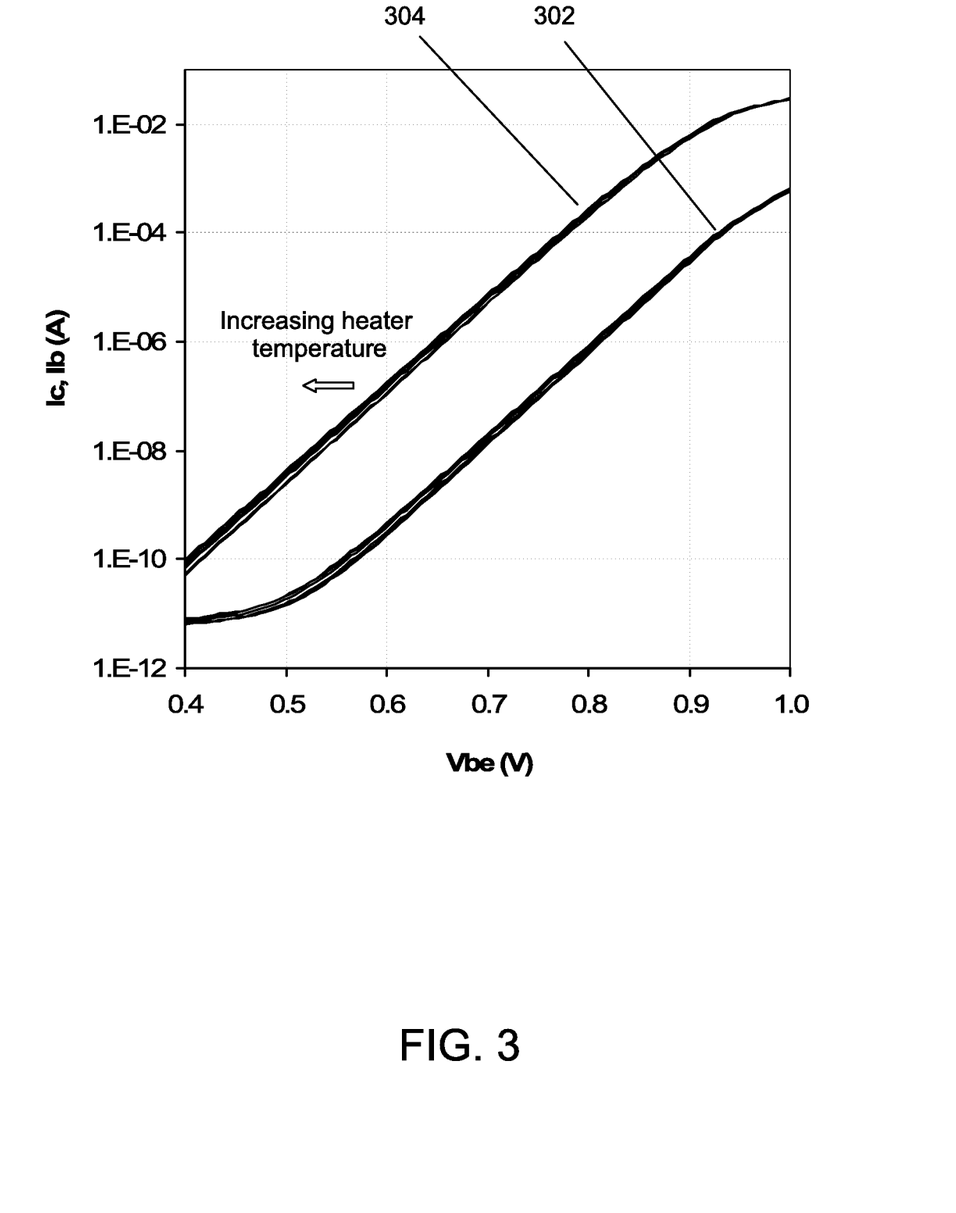
FIGS. 3-4 are graphs of a thermal response of a device of the design structure of FIG. 1 according to an embodiment of the invention disclosed herein.
Figure 4:
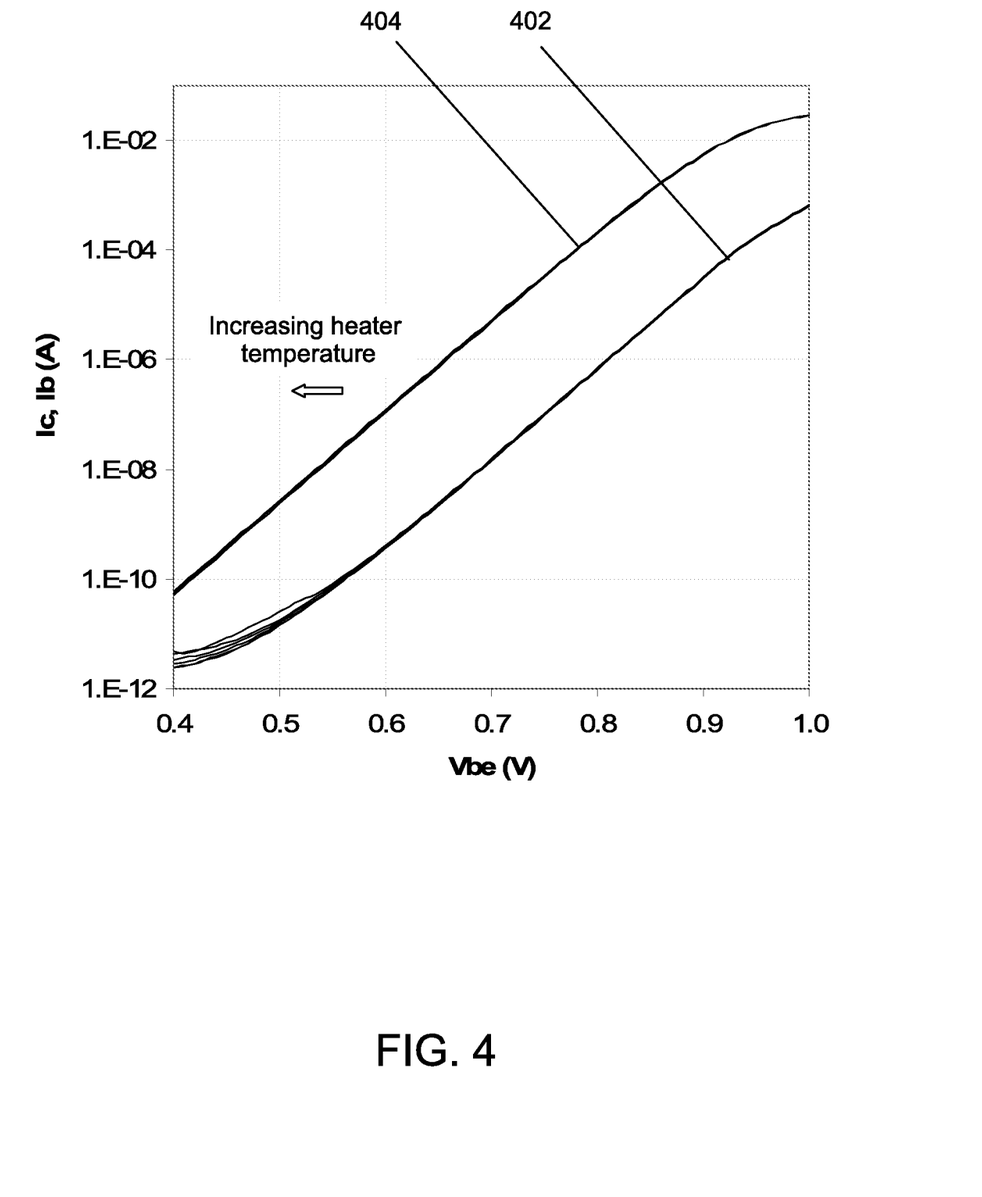

To assist in describing an example of determining a device's response to a heat source according to embodiments, FIGS. 3 and 4 show Gummel curves for different devices of circuit or design structure 100 during operation of a first device 102 as a heater. In particular, FIG. 3 shows Gummel curves 302, 304 for device 112 when it is operated as a sensor in response to device 102 being operated as a heater. Device 102 may be biased at a series of fixed base and collector voltages ($V_{be}$ and $V_{cb}$) and allowed to achieve a steady-state heat at each voltage. The series of voltage values applied to heater device 102 may result in heater device 102 generating increasing levels of steady-state heat due to self-heating. These values of steady-state heat may be determined using any suitable technique, many of which are known in the art. A base and collector current ($I_b$ and $I_c$) Gummel curve pair corresponding to each steady-state heat value due to heater device 102 may be measured for each device, such as device 112 as shown in FIG. 3. As may be seen in FIG. 3, a shift in $I_c$ curve 304 and $I_b$ curve 302 to lower $V_{be}$ with increasing steady-state heat may occur, which may be evidence of thermal coupling of device 112 to adjacently located heater device 102. Similarly, FIG. 4 shows Gummel curves 402, 404 for device 118 when it is operated as a sensor in response to device 102 being operated as a heater and biased at each of the same series of fixed $V_{be}$ and $V_{cb}$ voltages as described above. The shift of $I_c$ curve 404 and $I_b$ curve 402 to lower $V_{be}$ with increasing steady-state heat tends to be smaller, indicating a smaller thermal coupling effect on device 118, which is located at a greatest distance from heater device 102. As seen in FIGS. 3 and 4, the effect of heater device 102 on remaining devices 104-118 operated as sensors, particularly the temperature observed for a given current as reflected by the values of $V_{be}$, diminishes with increasing distance from heater device 102. By repeating this measurement with each of remaining devices 104, 106, 108, 114, and 116 being operated as a sensor in response to device 102 being operated as a heater and biased at each of the same series of fixed $V_{be}$ and $V_{cb}$ voltages, an effect of operation of first device 102 on the devices of the circuit or design structure 100 may be observed. By then switching to each of second through eighth devices 104-118 as a heater one at a time while using remaining devices 102, 106-118 as sensors, an effect of operation of each device 102-118 on the devices of the circuit or design structure may be observed. To develop an even more complete analysis, such measurements may be taken with combinations of devices 102-118 operated as heater groups while the rest of devices 102-118 are used as sensors.

Thermal coupling coefficients may be determined for devices 102-118 from these measurements, and may be a set of location-dependent values that, in general, decrease with increasing distance from the heater and are consistent with changes in internal temperature, as reflected in $V_{be}$. Because the thermal responses of devices 102-118 in this example are to a steady-state heat source, these thermal coupling coefficients may be associated with the thermal resistance of the self-heating network of each of devices 102-118.

In embodiments, thermal coupling coefficients associated with sensor device thermal resistance and thermal capacitance may be determined. For example, such thermal coupling coefficients may be determined using measurements of a sensor device's steady-state thermal response to a heater device's steady-state thermal output, measurements of a sensor device's transient thermal response to a heater device's transient thermal output, and/or measurements of a sensor device's small-signal thermal response to a heater device's small-signal thermal output. The resulting thermal coupling coefficients may then be used in circuit design and simulation as will be explained below.

Information derived from observations such as those described above, including thermal coupling coefficients, may then be stored, such as in a data file on a computer readable storage device, so that circuit or design structure 100 may be modeled with thermal coupling taken into account. As a result, a final product based on a final, modified circuit or design structure 100 may benefit from better performance, higher efficiency, lower failure rate, and/or longer life than a similar product in which the inventive thermal coupling analysis, determination, and/or representation is not employed.

Figure 5:
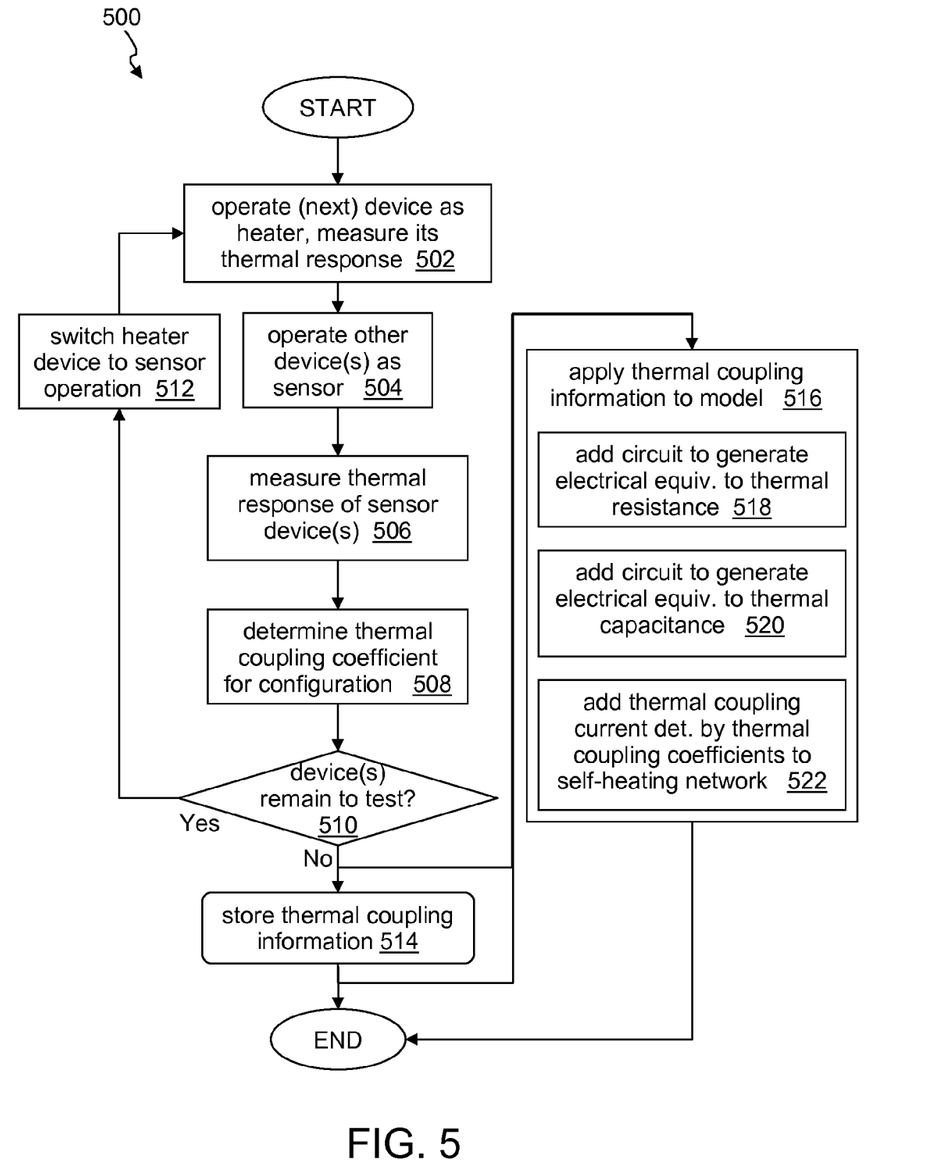
FIG. 5 is a schematic flow diagram of a method of determining and representing thermal coupling effects according to an embodiment of the invention disclosed herein.

Referring to FIG. 5, a thermal coupling analysis and representation method 500 according to an embodiment of the invention is shown. As suggested above, a device may be operated as a heater and its thermal response due to self-heating may be measured (block 502). At least one other device may be operated as a sensor (block 504). A thermal response of the sensor device may be measured (block 506), and at least one thermal coupling coefficient may be determined for the configuration of heater/sensor devices (block 508). For example, transient response of both the heater device(s) and the sensor device(s) may be captured, such as by measuring a time constant of the thermal response, which may then be used to determine at least one thermal coupling coefficient. It may be determined whether at least one device remains to be tested (decision block 510). Responsive to at least one device remaining to be tested, the heater device may be switched to sensor operation (block 512), and blocks 502-510 may be repeated with a next device. Responsive to no device remaining to be tested (decision block 510), thermal coupling information may be stored (block 514), such as in a data file on a computer readable storage device.

After storage or instead of storage of the thermal coupling information (block 514), embodiments may proceed to apply the thermal coupling information to a device model (block 516). In particular, a first circuit may be added to the model that may generate an electrical signal, such as a node voltage or a branch current, that is substantially equivalent to a thermal resistance of the device's self-heating network (block 518), which may be temperature-dependent. In addition, a second circuit may be added to the model that may generate an electrical signal, such as a node voltage or a branch current, that is equivalent to a thermal capacitance of the device's self-heating network (block 520), which also may be temperature-dependent. Each of the first and second circuits may comprise, for example, two components to achieve the desired effect. In embodiments, a node voltage $n_{rth}$ may be generated during circuit simulation that may represent the device's thermal resistance by introducing an ideal DC current source, forcing one unit of current through an ideal resistor whose value is set substantially equal to the device's thermal resistance at that circuit simulation step. A node voltage $n_{cth}$ may be generated during circuit simulation that may represent the device's thermal capacitance in a similar manner. In embodiments, to represent an effect on the sensor device of thermal coupling due to a nearby heater device with time-varying thermal output voltage $v_h(t)$, such as the voltage on the thermal node of the heater device's self-heating network, and thermal coupling coefficients $m_{xr}$ and $m_{xc}$, a thermal current $i_{thxc}(t)$ may be determined, generated and applied to the sensor device's self-heating network (block 522). For example, thermal current $i_{thxc}(t)$ may be determined by:

$$i_{thxc}(t)=m_{xr}*v_h(t)/n_{rth}+m_{xc}*n_{cth}*d(v_h(t))/dt.$$

though embodiments of the invention disclosed herein encompass variants of this formula and/or other methods of determining thermal current $i_{thxc}(t)$. The resulting temperature change at the thermal node of the sensor device's self-heating network may thus be due to self-heating and/or thermal coupling.

Figure 6:
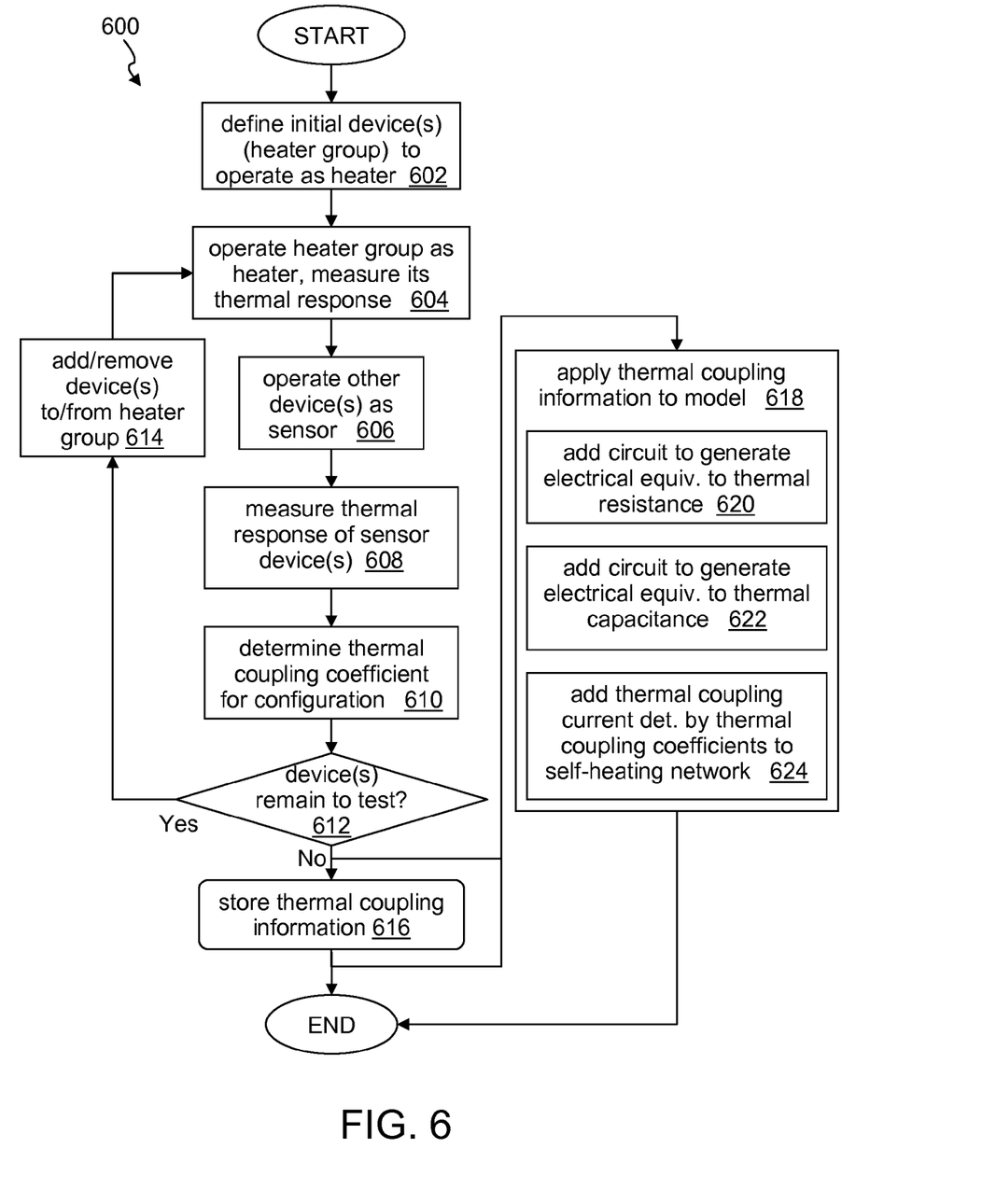
FIG. 6 is a schematic flow diagram of a method of determining and representing thermal coupling effects according to an embodiment of the invention disclosed herein.

In other embodiments, as seen in FIG. 6, a thermal coupling analysis and representation method 600 may define an initial group of devices to operate as a heater (block 602). The heater group may be operated as a heater and a thermal response of the heater group due to self-heating and thermal interaction may be measured (block 604). At least one other device may be operated as a sensor (block 606) and a thermal response of the sensor may be measured (block 608). For example, transient responses of the heater group device(s) and/or the heat sensor device(s) may be captured, such as by measuring time constants of the thermal responses. At least one thermal coupling coefficient may be determined for the configuration of heater/sensor devices (block 610), and it may be determined whether at least one device remains to be tested (decision block 612). Responsive to at least one device remaining, at least one device may be added to the heater group and/or at least one device may be removed from the heater group (block 614), and blocks 604-612 may be repeated with the reconfigured heater group. Responsive to no device remaining to be tested (decision block 612), thermal coupling information may be stored (block 616), such as in a data file on a computer readable storage device.

As with the example shown in FIG. 5, after storage or instead of storage of the thermal coupling information (block 616), embodiments may proceed to apply the thermal coupling information to a device model (block 618). In particular, a first circuit may be added to the model that may generate an electrical signal, such as a node voltage or a branch current, that may be substantially equivalent to a thermal resistance of the device's self-heating thermal network (block 620), which may be temperature-dependent. In addition, a second circuit may be added to the model that may generate an electrical signal, such as a node voltage or a branch current, that is substantially equivalent to a thermal capacitance of the device's self-heating network (block 622), which also may be temperature-dependent. Each of the first and second circuits may comprise, for example, two components to achieve the desired effect.

In embodiments, node voltages that are to be generated may be determined using the same formulae as those employed above in relation to the example shown in FIG. 5. In addition, to represent an effect on the sensor device of thermal coupling due to a group of heater devices with time-varying thermal output voltage $v_h(t)$, and thermal coupling coefficients $m_{xr}$ and $m_{xc}$, a thermal current $i_{thxc}(t)$ may be determined, generated, and applied to the sensor device's self-heating network (block 624) in embodiments. For example, thermal current $i_{thxc}(t)$ may be determined by:

$$i_{thxc}(t)=m_{xr}*v_h(t)/n_{rth}+m_{xc}*n_{cth}*d(v_h(t))/dt,$$

though embodiments of the invention disclosed herein encompass variants of this formula and/or other methods of determining thermal current $i_{thxc}(t)$. Similar to the example described above, the resulting temperature change at the thermal node of the sensor device's self-heating network may thus be due to self-heating and/or thermal coupling.

Electrical equivalents of thermal coupling effects according to embodiments may then be represented during simulation of circuit designs structures, allowing better prediction of device behavior in a given device design. It is possible to represent thermal coupling effects during simulation on multiple devices, and to represent thermal coupling effects during simulation between devices where each device acts as both a heater and a sensor, such as in a differential pair, an array of multifinger devices, such as in a power amplifier, and/or other suitable device(s) as may be appropriate and/or desired.

Figure 7:
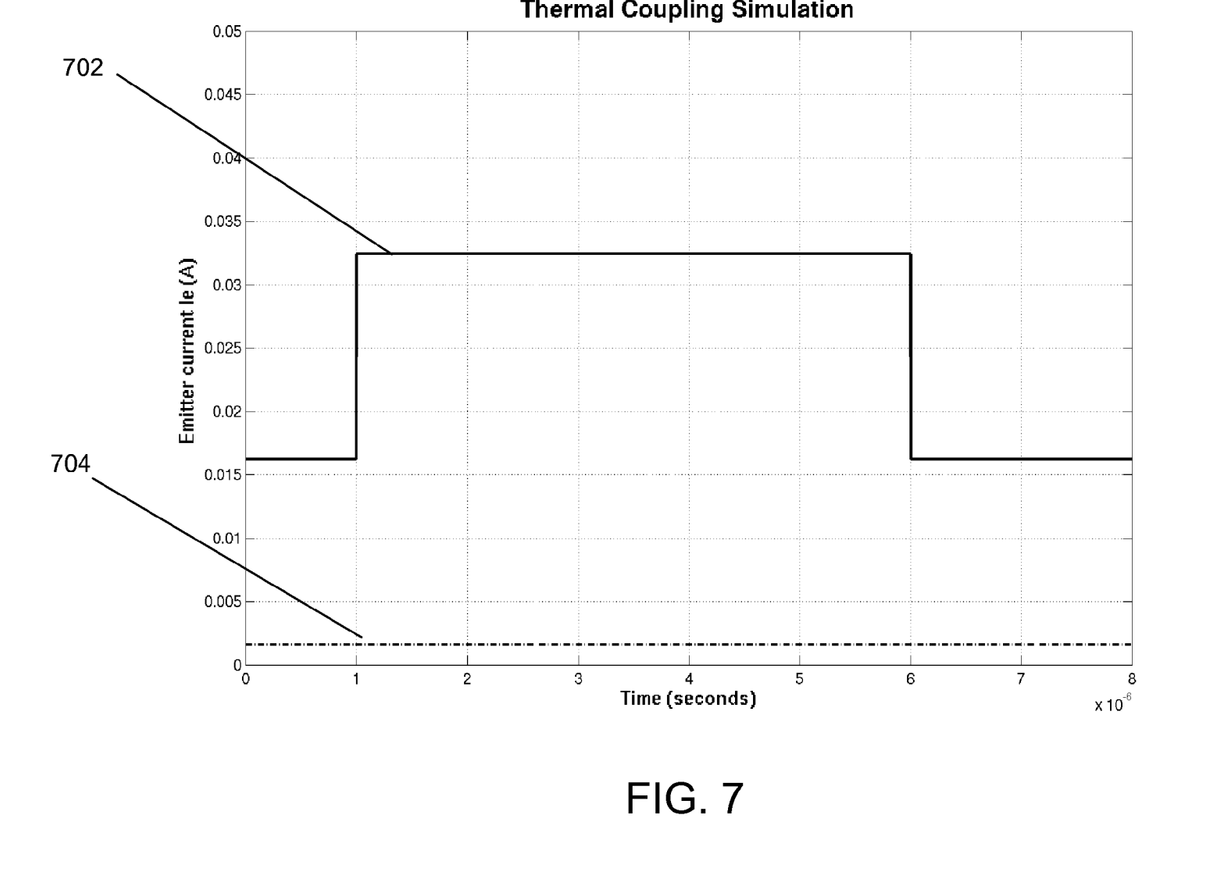
FIGS. 7-9 are graphs of a representation of thermal coupling according to an embodiment of the invention disclosed herein.
Figure 8:
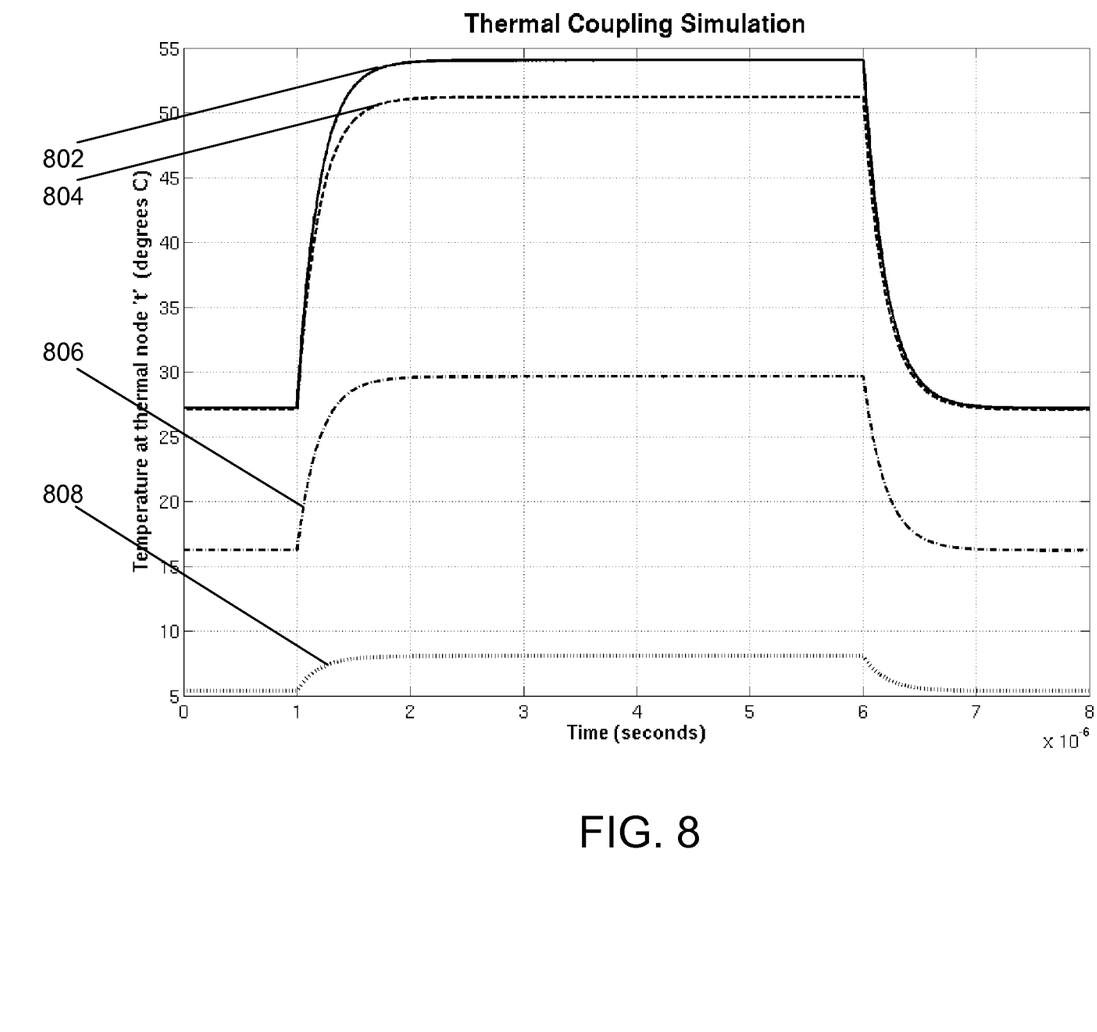
Figure 9:
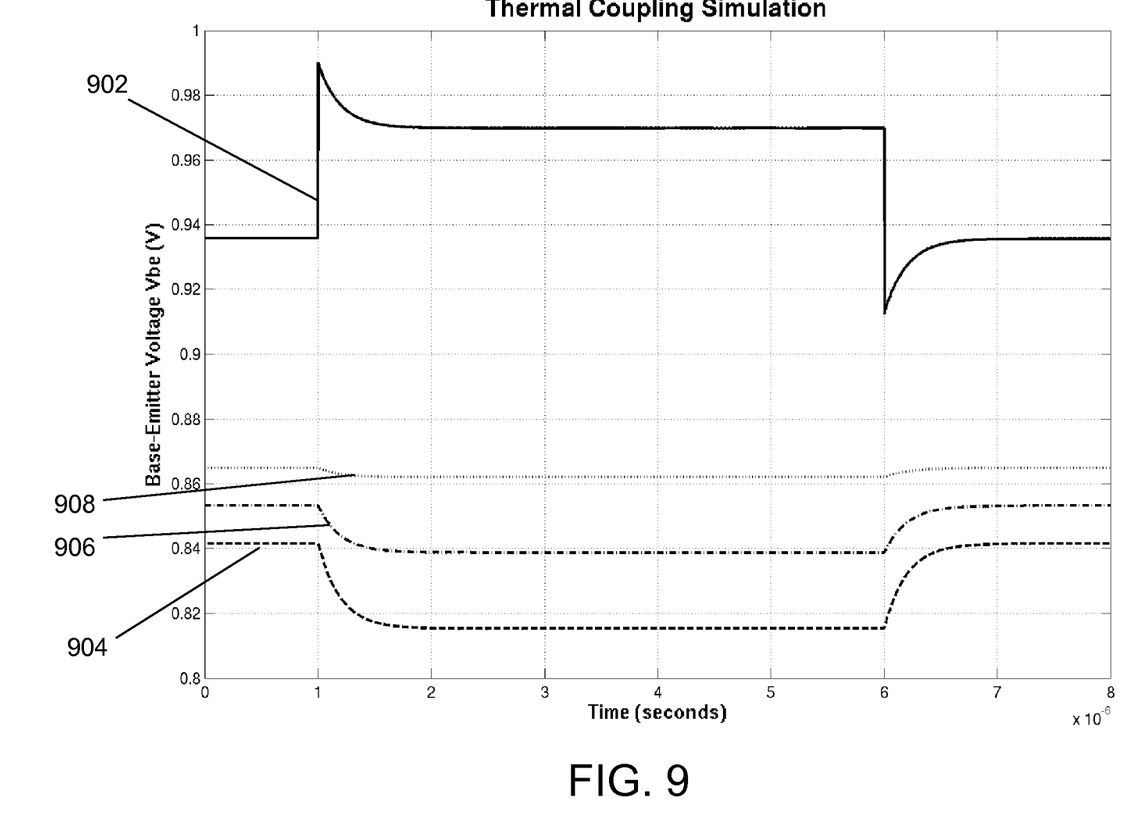
Figure 10:
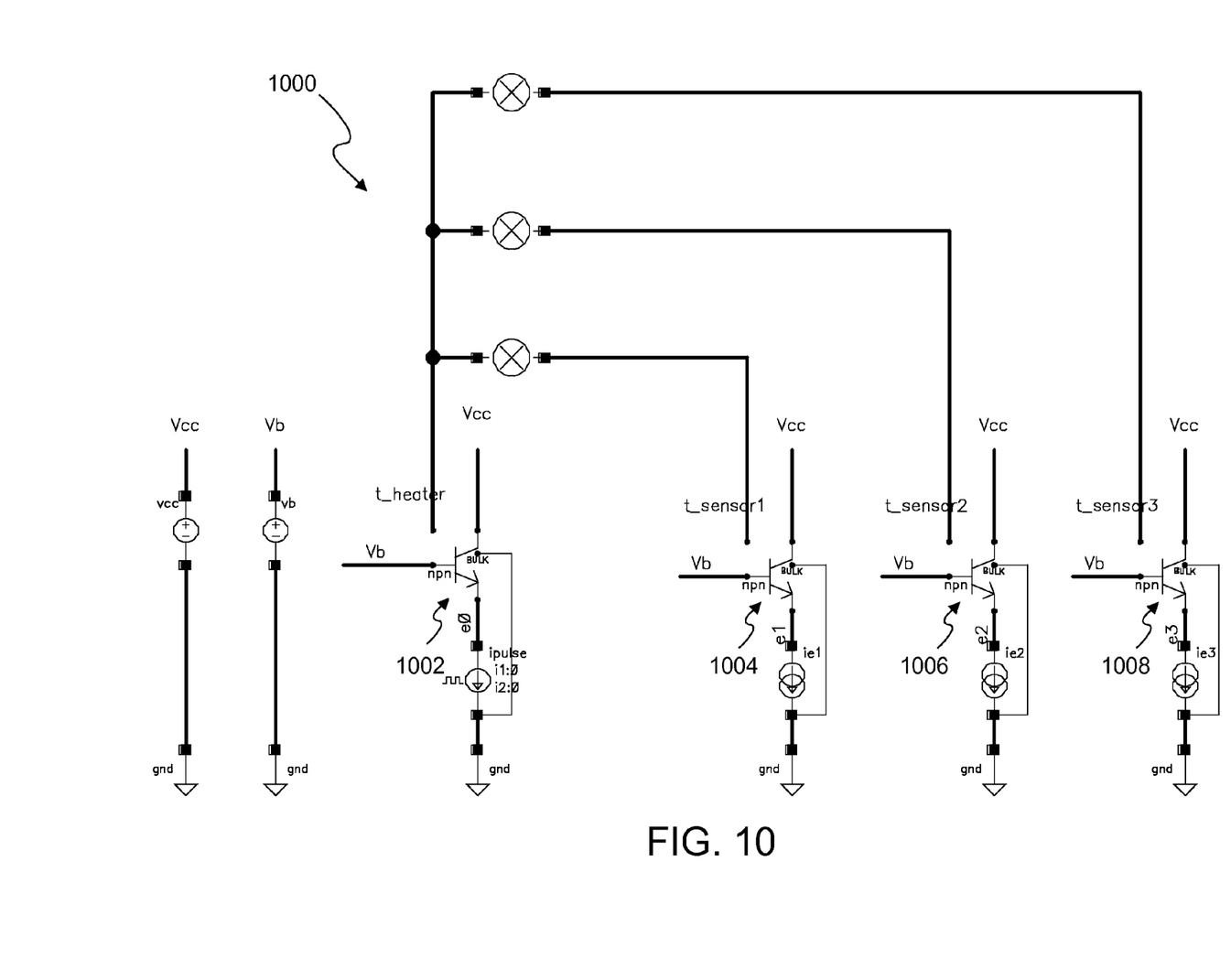
FIG. 10 is a schematic diagram of a representation of thermal coupling according to an embodiment of the invention disclosed herein.

An example of an impact on circuit response when thermal coupling effects are included in a circuit design structure simulation according to embodiments is shown in a set of applied current bias curves 702-704 in FIG. 7, a set of response curves 802-808 in FIG. 8, and a set of response curves 902-908 in FIG. 9, in accordance with schematic diagram 1000 in FIG. 10. Applied emitter current bias curves 702-704 in FIG. 7 represent emitter current $I_e$ vs. time during simulation for transistor devices 1002, 1004, 1006, and 1008 in schematic 1000 of FIG. 10. Response curves 802-808 in FIG. 8 represent temperature generated at the thermal node of the device's thermal network vs. time, and response curves 902-908 represent base-emitter voltage $V_{be}$ vs. time for each of the same transistor devices in schematic 1000 during simulation. Three identical devices 1004-1008 in schematic 1000 of FIG. 10 may be biased at a same value of current and may be expected to be placed near a device 1002. Device 1002 may be biased at a higher value of current and then pulsed with additional current during its operation. Because of its high current during operation, device 1002 may be expected to generate significant heat, and an impact of its self-heating on the three nearby devices may be examined in simulation. Based on their locations relative to device 1002, devices 1004, 1006, and 1008 may be assigned thermal coupling coefficients, according to embodiments. For example, a thermal coupling coefficient assigned to device 1004, which is adjacent device 1002, may be larger than a thermal coupling coefficient assigned to device 1008, which is farthest from device 1002. A thermal coupling coefficient assigned to device 1006, which is located between devices 1004 and 1008, may be a value between that of the thermal coupling coefficients of devices 1004 and 1008.

As shown in FIG. 7, at a start time t=0 s, a high emitter current or pulse of current 702 may be applied to device 1002, and a constant emitter current 704 may be applied to each of devices 1004, 1006, and 1008. In FIG. 8, a temperature curve 802 may be determined based on information generated at the thermal node of the device's thermal network for heater device 1002. Temperature curve 802 may increase in response to pulse of current 702 applied to heater device 1002, then decrease when the pulse of current 702 is removed. Temperature curve 804 generated at the thermal node of device 1004's thermal network closely follows temperature curve 802 in accordance with thermal coupling prediction according to embodiments of the present invention. Temperature curve 806 generated at the thermal node of device 1006's thermal network also follows temperature curve 802 over time, but is lower in amplitude because the respective thermal coupling coefficient is smaller, which reflects its more distant location relative to device 1002. Similarly, temperature curve 808 generated at the thermal node of device 1008's thermal network follows temperature curve 802 over time, but is lowest in amplitude because the respective thermal coupling coefficient is smallest, which reflects its most distant location relative to device 1002.

The response curves shown in FIG. 9 in turn show an impact of changing temperature presented in FIG. 8 on device characteristics. For example, base-emitter voltage $V_{be}$ curve 902 of heater device 1002 is high at time t=0 s because its current is high, then increases abruptly at time t=1 μs in response to the pulse of current 702 applied to heater device 1002, then decreases somewhat as heater device 1002 heats due to its own increase in power dissipation, until its self-heating thermal network reaches a steady-state temperature. At time t=6 μs, $V_{be}$ curve 902 decreases abruptly in response to the pulse of current 702 being removed, then increases somewhat as heater device 1002 loses heat due to its own decrease in power dissipation, until its self-heating thermal network again reaches a steady-state temperature. As may be seen in FIG. 9, $V_{be}$ curves 904, 906, 908 of respective sensor devices 1004, 1006, 1008 change in accordance with their respective temperature curves 804, 806, and 808. It also may be seen in $V_{be}$ curves 904-908 that there is less of a response to the pulse of current 702 applied to heater device 1002 when the temperatures generated at the thermal nodes of the device thermal networks change less. These temperatures are in accordance with the values used for the thermal coupling coefficients in simulation, which in turn reflect the planned locations for devices 1004-1008 relative to heater device 1002.

In embodiments, it may be desired to simulate the effect of thermal coupling on a first device in the presence of an adjacent device, or devices, that are electro-thermally in parallel with the first device, and dissipating heat such that all the devices have substantially the same time-dependent thermal relationship. To simulate such a thermal coupling effect, at least one thermal coefficient determined according to embodiments may be incorporated into a model to transform thermal resistance and/or thermal capacitance values of the device's self-heating network. In particular, an effective thermal impedance $Z_{theff}$ of the first device may be created by multiplying the thermal impedance of the self-heating network $Z_{thsh}$ times the respective thermal coupling coefficient(s) m so that $Z_{theff}=Z_{thsh} \times m$. A resulting temperature rise at the thermal node of the self-heating network of the first device may therefore take into account self-heating and/or thermal coupling effects.

Figure 11:
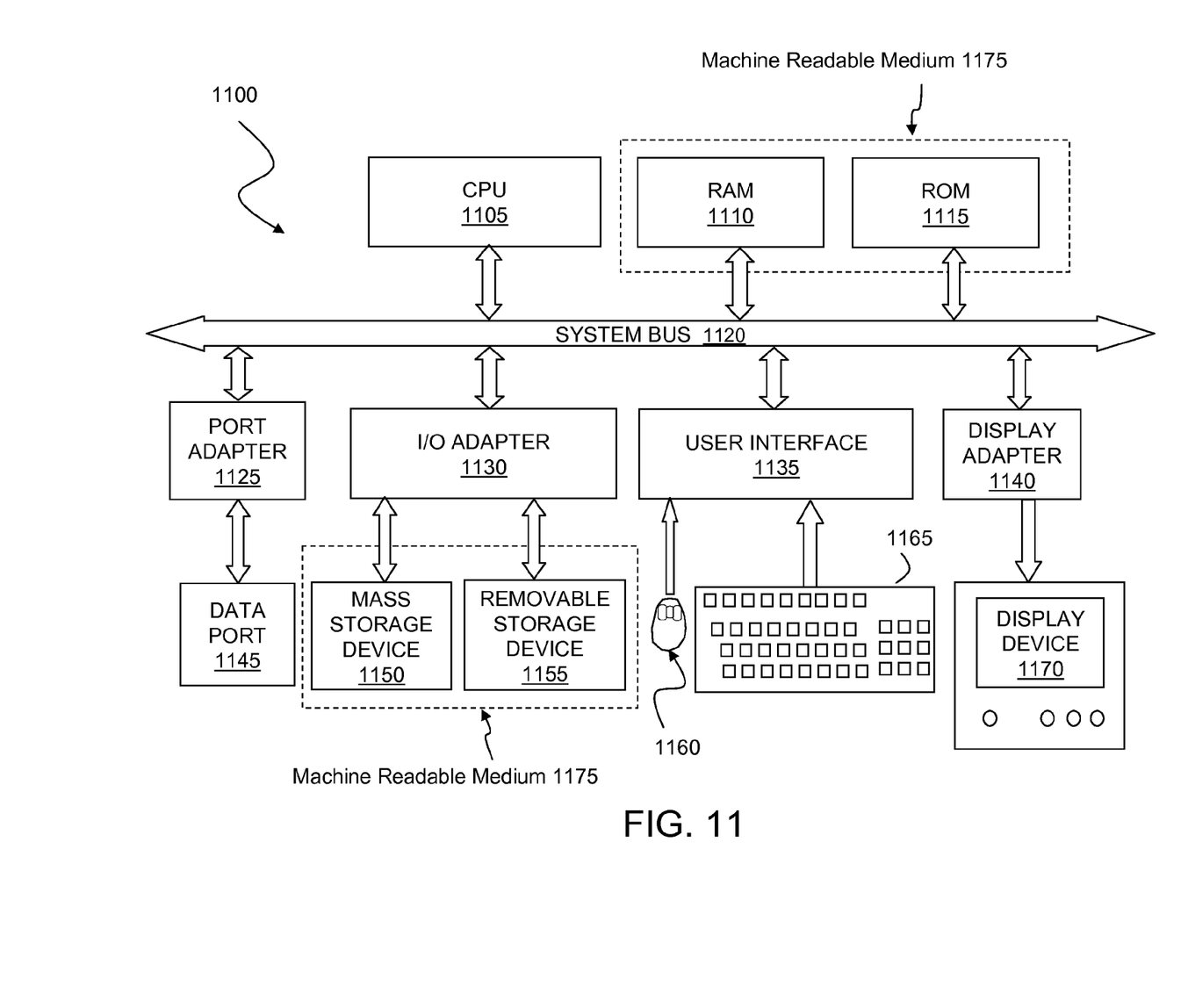
FIG. 11 is a schematic block diagram of a general purpose computer system which may be used to practice embodiments of the invention disclosed herein.

FIG. 11 illustrates a block diagram of a general-purpose computer system which can be used to implement a circuit and circuit design structure taking into account thermal coupling information obtained as described herein. The design structure may be coded as a set of instructions on removable or hard media for use by general-purpose computer. FIG. 11 is a schematic block diagram of a general-purpose computer for practicing the present invention. FIG. 11 shows a computer system 1100, which has at least one microprocessor or central processing unit (CPU) 1105. CPU 1105 is interconnected via a system bus 1120 to machine readable media 1175, which includes, for example, a random access memory (RAM) 1110, a read-only memory (ROM) 1115, a removable and/or program storage device 1155 and a mass data and/or program storage device 1150. An input/output (I/O) adapter 1130 connects mass storage device 1150 and removable storage device 1155 to system bus 1120. A user interface 1135 connects a keyboard 1165 and a mouse 1160 to system bus 1120, and a port adapter 1125 connects a data port 1145 to system bus 1120 and a display adapter 1140 connect a display device 1170. ROM 1115 contains the basic operating system for computer system 1100. Examples of removable data and/or program storage device 1155 include magnetic media such as floppy drives, tape drives, portable flash drives, zip drives, and optical media such as CD ROM or DVD drives. Examples of mass data and/or program storage device 1150 include hard disk drives and non-volatile memory such as flash memory. In addition to keyboard 1165 and mouse 1160, other user input devices such as trackballs, writing tablets, pressure pads, microphones, light pens and position-sensing screen displays may be connected to user interface 1135. Examples of display device 1170 include cathode-ray tubes (CRT) and liquid crystal displays (LCD).

A machine readable computer program may be created by one of skill in the art and stored in computer system 1100 or a data and/or any one or more of machine readable medium 1175 to simplify the practicing of this invention. In operation, information for the computer program created to run the present invention is loaded on the appropriate removable data and/or program storage device 1155, fed through data port 1145 or entered using keyboard 1165. A user controls the program by manipulating functions performed by the computer program and providing other data inputs via any of the above mentioned data input means. Display device 1170 provides a means for the user to accurately control the computer program and perform the desired tasks described herein.

Figure 12:
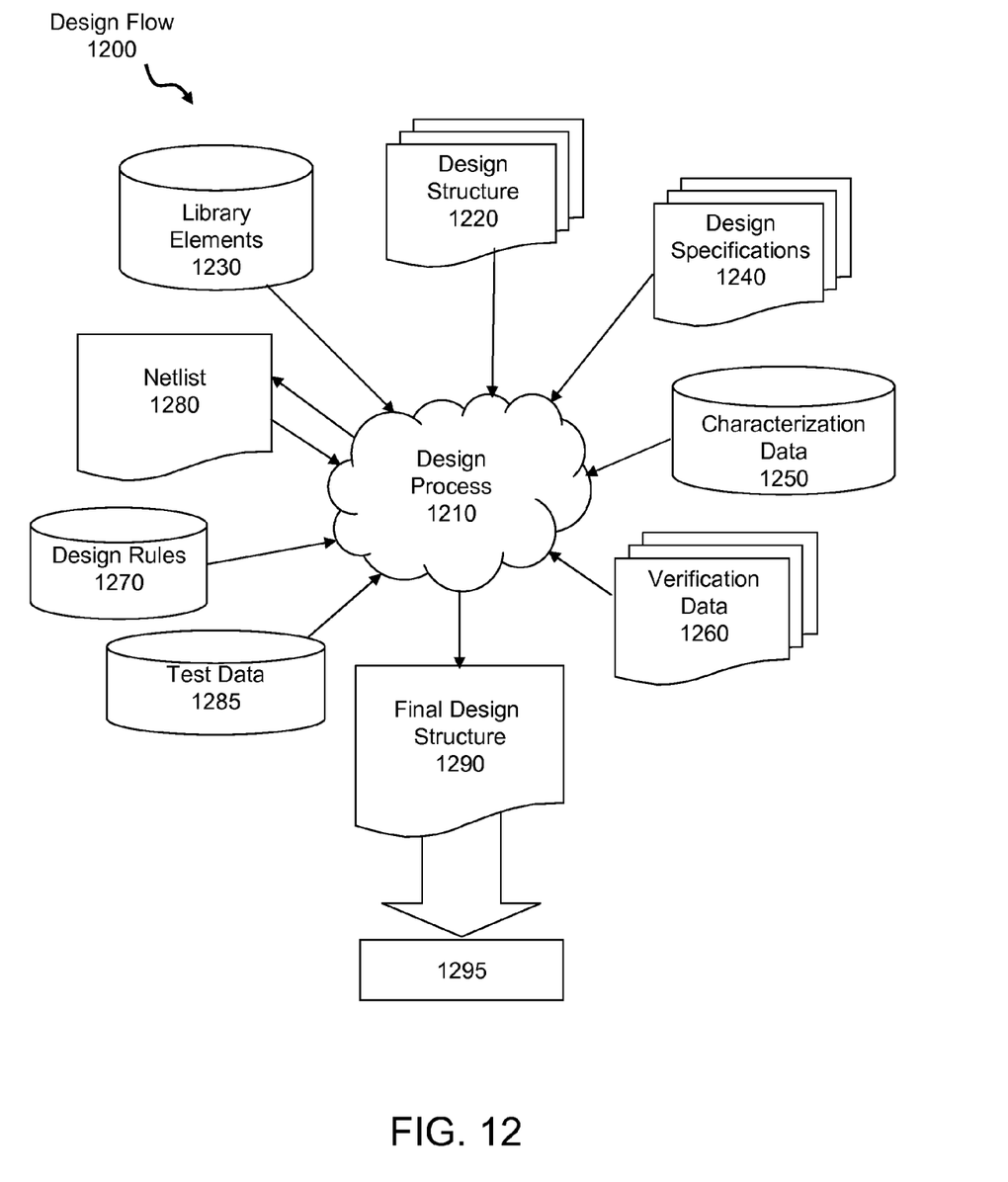
FIG. 12 is a schematic flow diagram of a design process used in semiconductor design, manufacturing, and/or test of embodiments of the invention disclosed herein.

FIG. 12 shows a block diagram of an example design flow 1200. Design flow 1200 may vary depending on the type of IC being designed. For example, a design flow 1200 for building an application specific IC (ASIC) may differ from a design flow 1200 for designing a standard component. Design structure 1220 is preferably an input to a design process 1210 and may come from an IP provider, a core developer, or other design company or may be generated by the operator of the design flow, or from other sources. Design structure 1220 comprises a thermal coupling determining and/or modified circuit or structure according to embodiments in the form of schematics or HDL, a hardware-description language (e.g., Verilog, VHDL, C, etc.). Design structure 1220 may be contained on one or more machine readable medium. For example, design structure 1220 may be a text file or a graphical representation of a thermal coupling determining and/or modified circuit or structure according to embodiments. Design process 1210 preferably synthesizes (or translates) a thermal coupling determining and/or modified circuit or structure according to embodiments into a netlist 1280, where netlist 1280 is, for example, a list of wires, transistors, logic gates, control circuits, I/O, models, etc., that describes the connections to other elements and circuits in an integrated circuit design and recorded on at least one of machine readable medium. This may be an iterative process in which netlist 1280 is resynthesized one or more times depending on design specifications and parameters for the circuit.

Design process 1210 may include using a variety of inputs; for example, inputs from library elements 1230 which may house a set of commonly used elements, circuits, and devices, including models, layouts, and symbolic representations, for a given manufacturing technology (e.g., different technology nodes, 32 nm, 45 nm, 40 nm, etc.), design specifications 1240, characterization data 1250, verification data 1260, design rules 1270, and test data files 1285 (which may include test patterns and other testing information). Design process 1210 may further include, for example, standard circuit design processes such as timing analysis, verification, design rule checking, place and route operations, etc. One of ordinary skill in the art of integrated circuit design can appreciate the extent of possible electronic design automation tools and applications used in design process 1210 without deviating from the scope and spirit of the invention. The design structure of the invention is not limited to any specific design flow.

Ultimately, design process 1210 preferably translates a thermal coupling determining and/or modified circuit or structure according to embodiments, along with the rest of the integrated circuit design (if applicable), into a final design structure 1290 (e.g., information stored in a GDS storage medium). Final design structure 1290 may comprise information such as, for example, test data files, design content files, manufacturing data, layout parameters, wires, levels of metal, vias, shapes, test data, data for routing through the manufacturing line, and any other data required by a semiconductor manufacturer to produce a thermal coupling determining and/or modified circuit or structure according to embodiments. Final design structure 1280 may then proceed to a stage 1285 where, for example, final design structure 1280 proceeds to tape-out, is released to manufacturing, is sent to another design house or is sent back to the customer.

The descriptions of the various embodiments of the present invention have been presented for purposes of illustration, but are not intended to be exhaustive or limited to the embodiments disclosed. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-executed method of representing thermal coupling effects in a semiconductor structure, the semiconductor structure including at least a first device selectively operable as a heater and as a sensor, and at least a second device selectively operable as a heat sensor and as a heater, the computer-executed method, when executed by a computing device, causing the computing device to perform a method comprising:

operating the first device as a heater;
operating the second device as a heat sensor;
measuring a first thermal response of the first device to operating the first device as a heater;
measuring a first thermal response of the second device to operating the first device as a heater;
determining, with the computing device, at least one first thermal coupling coefficient using the measured first thermal response of the first device and the measured first thermal response of the second device;
switching operation of the first device to operation as a heat sensor;
switching operation of the second device to operation as a heater;
measuring a second thermal response of the second device to operating the second device as a heater;
measuring a second thermal response of the first device to operating the second device as a heater;
determining at least one second thermal coupling coefficient using the measured second thermal response of the first device and the measured second thermal response of the second device; and
modifying the semiconductor structure using at least one of the effective thermal impedance of the first device or the at least one thermal coupling coefficient.

2. The method of claim 1, further comprising:
determining a self-heating thermal impedance of the first device; and
determining an effective thermal impedance of the first device based on at least the self-heating thermal impedance of the first device and the at least one thermal coupling coefficient.

3. The method of claim 1, further comprising:
providing a thermal node of a self-heating network usable in a design flow of an initial design structure of the semiconductor structure;
providing a first value representing a thermal resistance of the self-heating network of the initial design structure;
providing a second value representing a thermal capacitance of the self-heating network of the initial design structure;
providing a thermal output of a heater design structure; and
representing thermal coupling as a current flow into the thermal node of the self-heating network, the current flow being determined using the thermal output of the heater design structure, at least one of the first or second thermal coupling coefficients, and at least the second value of the self-heating network.

* * * * *